Feb. 27, 1945. E. W. CREEKBAUM 2,370,232
AGRICULTURAL TOOL-TRACTOR ROPE HITCH
Filed Sept. 25, 1943
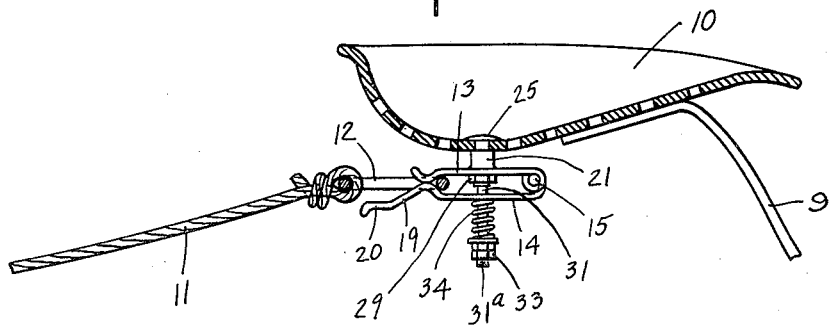
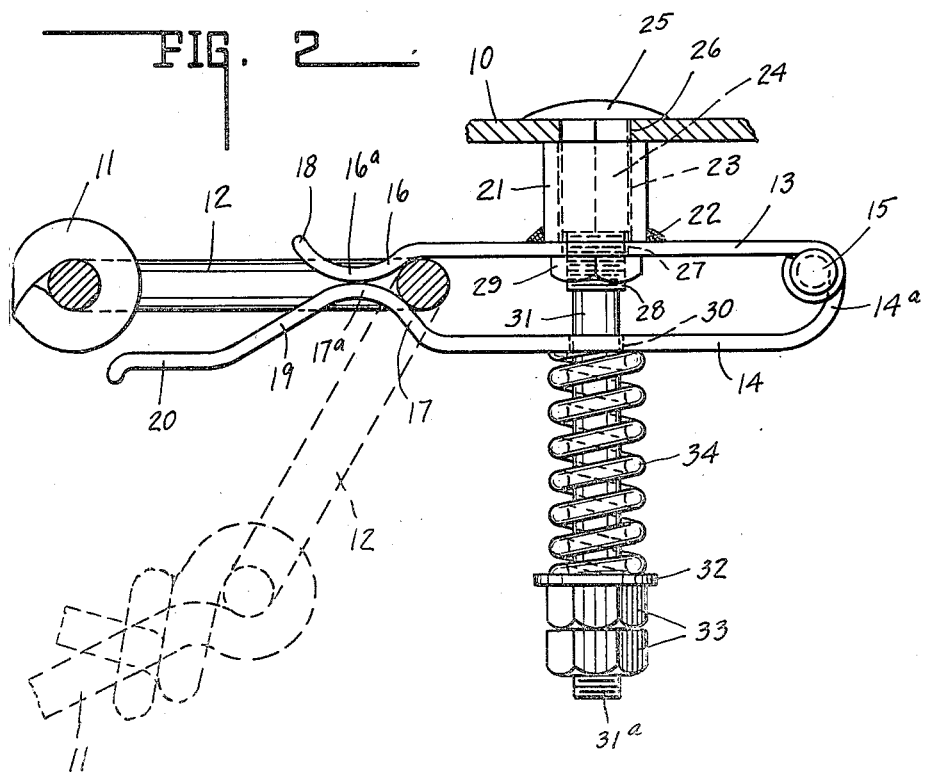
INVENTOR.
EMERY W. CREEKBAUM.
BY Lockwood, Goldsmith & Galt
ATTORNEYS.

Patented Feb. 27, 1945

2,370,232

UNITED STATES PATENT OFFICE 2,370,232

AGRICULTURAL TOOL-TRACTOR ROPE HITCH

Emery W. Creekbaum, Danville, Ind., assignor of one-half to Hayden H. Crawford, Danville, Ind.

Application September 25, 1943, Serial No. 503,784

7 Claims. (Cl. 280—150)

This invention relates to a rope hitch between a self-propelled power unit and an agricultural implement, same being one-man controlled. Broadly, this invention is directed to a rope hitch and of improved character, but used as the hitch is used in the expired prior patent to Wilde No. 1,423,785, for the latter discloses a tractor, an agricultural tool, a drawbar therebetween and a tool control rope which terminates at the tractor and for operator convenience broadly is releasably connected to the seat thereof.

The present invention, accordingly, is directed to a tractor seat attachable tool controlling rope hitch and, more particularly, the rope and hitch connection, and the seat and hitch connection, and the simplification thereof.

One chief feature of the invention is the rope termination, being of rigid, closed loop type, such as a ring, which, when hitch associated, is semi-permanently retained thereby with considerable freedom of movement therebetween, but when intended to be released, can and will be readily (though forcibly) released and similarly reconnected.

Another chief feature of the invention resides in the singular element that is mounted on the tractor seat and upon which the hitch leaves also are mounted.

Other objects and features will be set forth more fully hereinafter.

The full nature of the invention will be understood from the accompanying drawing and the following description and claims:

In the drawing

Fig. 1 is a longitudinal sectional view through a tractor seat and the invention, the loop thereof being shown in elevation.

Fig. 2 is an enlarged side elevation thereof.

In Fig. 1 of the drawing 9 indicates a support normally projecting upwardly and rearwardly from a tractor (not shown, but see Patent No. 1,423,785) and supporting a perforated metal seat 10 for tractor operator occupancy. As stated an agricultural tool is suitably connected to the tractor for cultivating, etc., and includes a control rope 11. In many instances this is tied to the seat or seat support so that when the tool stops, the tractor-tool connection releases, whereupon the rope is torn in two. The patent, as well as the present invention seeks to eliminate rope breaking.

Herein the tractor end of the rope 11 terminates in a closed loop such as the metallic ring 12. The hitch herein includes two pivotally connected leaves 13 and 14 normally constrained towards each other. Herein the hinge connection is at 15 and leaf 14 includes offset portion 14a for spacing purposes.

The two leaves remote from their pivotal connection have portions 16 and 17 directed towards each and away from the hinge. Portion 16 includes contact portion 16a from which extends the upwardly directed lip 18. Portion 17 includes contact portion 17a from which extends downwardly directed portion 19, the latter in turn terminating in the elongated finger piece 20.

Note that portions 18 and 19 form a receiving throat for ring 12 when forcibly applied thereto and portions 16 and 17 form a releasing throat. Herein leaf 14 is the movable leaf and leaf 13 is the stationary leaf.

Rigid with the upper face of leaf 13 is the tubular spacer 21, welded thereto as at 22. The tubularity 23 preferably is square in cross-section to seat the elongated square sectioned shank portion 24 of a bolt having head 25 that bears on the upper face of seat 10, which has a square hole 26 therethrough to non-rotatively seat the shank of said bolt.

The leaf 13 is apertured at 27, same registering with tubularity 23. Shank 24 is reduced at 28 and externally threaded to receive retaining nut 29. By this means the hitch is non-rotatively and rigidly connected to the seat.

The lower leaf 14 is also apertured as at 30 and same is aligned with aperture 27. The bolt shank is herein further reduced in diameter as at 31 and projects through aperture 30, the latter being sufficiently large to permit leaf 14 to pivot on hinge 15 without binding, or bending of the leaf 14 or stem 31.

The lower end of the stem 31 is threaded as at 31a to mount the bearing washer 32 and lock nuts 33. Concentric with the stem and interposed between washer 32 and leaf 14 and bearing at opposite ends upon the same is the coil spring 34.

This spring is of sufficient strength, the force of which is adjusted at 32—33 to hold the contact 16a—17a unless forcibly opened for insertion or release of ring 11. Note that the singular bolt and stem simultaneously secures the hitch to the seat and retains the hitch leaves together or in contact by means of spring 34. Offset 14a provides the pocket arrangement between the leaves to permit free movement of loop 12 (ring), in other words to non-clampingly mount and retain same. The two opposed throats facilitate predetermined seating and releasing of said metal loop when desired or required. For mounting, the finger piece is depressed so that excessive pressure on the loop is not required to open the receiving throat.

While the invention has been illustrated and described in great detail in the drawing and foregoing description, the same is to be considered as illustrative and not restrictive in character.

The invention claimed is:

1. An agricultural tool control hitch for tractor attachment including a single, elongated, attaching bolt for tractor attachment at one end of said bolt, a pair of elongated leaves hingedly connected together at one end and having a control retaining contact at the opposite end, said single bolt extending through both leaves intermediate the ends thereof, a coil spring upon the opposite and free end of said single bolt, and means on the free end thereof for spring retention and bearing, the other end of the spring having operative bearing on the leaf remote from the tractor attaching end of said bolt, the leaf closest to the tractor attaching end of the bolt including means about the bolt and projecting toward that end for spacing both leaves from the tractor attaching portion of said single bolt.

2. An agricultural tool control hitch for tractor attachment including a single, elongated, attaching bolt for tractor attachment at one end of said bolt, a pair of elongated leaves hingedly connected together at one end and having a control retaining contact at the opposite end, said single bolt extending through both leaves intermediate the ends thereof, a coil spring upon the opposite and free end of said single bolt, and means on the free end thereof for spring retention and bearing, the other end of the spring having operative bearing on the leaf remote from the tractor attaching end of said bolt, the leaf closest to the tractor attaching end of the bolt including means about the bolt and projecting toward that end for spacing both leaves from the tractor attaching portion of said single bolt, and nut means between the leaves and bolt mounted for rigidly connecting the hitch to the tractor.

3. An agricultural tool control hitch for tractor attachment including a single, elongated, attaching bolt for tractor attachment at one end of said bolt, a pair of elongated leaves hingedly connected together at one end and having a control retaining contact at the opposite end, said single bolt extending through both leaves intermediate the ends thereof, a coil spring upon the opposite and free end of said single bolt, and means on the free end thereof for spring retention and bearing, the other end of the spring having operative bearing on the leaf remote from the tractor attaching end of said bolt, the leaf closest to the tractor attaching end of the bolt including means about the bolt and projecting toward that end for spacing both leaves from the tractor attaching portion of said single bolt, the latter being a seat with a non-circular aperture therethrough, said last mentioned means including a similarly cross-sectional outlined tubularity, and the adjacent bolt portions seated in the aperture and tubularity having complementary cross-sectional outlines, and nut means between the leaves and bolt mounted for rigidly connecting the hitch to the tractor.

4. An agricultural tool control hitch for tractor attachment including an elongated bolt, a pair of elongated leaves hingedly connected together at one end and having a control retaining contact at the opposite end, said bolt extending through both leaves intermediate the ends thereof, a coil spring upon the free end of said bolt, and means on the free end thereof for spring retention and bearing, the other end of the spring having operative bearing on the leaf remote from the tractor attached end of said bolt, the spring bearing leaf adjacent the contact end including a finger engageable guide extension for hitch opening and guidance, the leaf closest to the tractor attached end of the bolt including means about the bolt and projecting toward that end for spacing both leaves from the bolt attaching portion of the tractor.

5. An agricultural tool control hitch for tractor attachment including an elongated bolt, a pair of elongated leaves hingedly connected together at one end and having a control retaining contact at the opposite end, said bolt extending through both leaves intermediate the ends thereof, a coil spring upon the free end of said bolt, and means on the free end thereof for spring retention and bearing, the other end of the spring having operative bearing on the leaf remote from the tractor attached end of said bolt, the spring bearing leaf adjacent the contact end including a finger engageable guide extension for hitch opening and guidance, the leaf closest to the tractor attached end of the bolt including means about the bolt and projecting toward that end for spacing both leaves from the bolt attaching portion of the tractor, the latter being a seat with a non-circular aperture therethrough, said last mentioned means including a similarly cross-sectional outlined tubularity, and the adjacent bolt portions seated in the aperture and tubularity having complementary cross-sectional outlines.

6. An agricultural tool control hitch for tractor attachment including an elongated bolt, a pair of elongated leaves hingedly connected together at one end and having a control retaining contact at the opposite end, said bolt extending through both leaves intermediate the ends thereof, a coil spring upon the free end of said bolt, and means on the free end thereof for spring retention and bearing, the other end of the spring having operative bearing on the leaf remote from the tractor attached end of said bolt, the spring bearing leaf adjacent the contact end including a finger engageable guide extension for hitch opening and guidance, the leaf closest to the tractor attached end of the bolt including means about the bolt and projecting toward that end for spacing both leaves from the bolt attaching portion of the tractor, and nut means between the leaves and bolt mounted for rigidly connecting the hitch to the tractor.

7. An agricultural tool control hitch for tractor attachment including an elongated bolt, a pair of elongated leaves hingedly connected together at one end and having a control retaining contact at the opposite end, said bolt extending through both leaves intermediate the ends thereof, a coil spring upon the free end of said bolt, and means on the free end thereof for spring retention and bearing, the other end of the spring having operative bearing on the leaf remote from the tractor attached end of said bolt, the spring bearing leaf adjacent the contact end including a finger engageable guide extension for hitch opening and guidance, the leaf closest to the tractor attached end of the bolt including means about the bolt and projecting toward that end for spacing both leaves from the bolt attaching portion of the tractor, the latter being a seat with a non-circular aperture therethrough, said last mentioned means including a similarly cross-sectional outlined tubularity, and the adjacent bolt portions seated in the aperture and tubularity having complementary cross-sectional outlines, and nut means between the leaves and bolt mounted for rigidly connecting the hitch to the tractor.

EMERY W. CREEKBAUM.